(12) United States Patent
Li

(10) Patent No.: US 12,069,656 B2
(45) Date of Patent: Aug. 20, 2024

(54) DOWNLINK DATA RECEIVING METHOD AND DEVICE, DOWNLINK DATA SENDING METHOD AND DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 487 days.

(21) Appl. No.: 17/421,335

(22) PCT Filed: Jan. 8, 2019

(86) PCT No.: PCT/CN2019/070848
§ 371 (c)(1),
(2) Date: Jul. 7, 2021

(87) PCT Pub. No.: WO2020/142900
PCT Pub. Date: Jul. 16, 2020

(65) Prior Publication Data
US 2022/0070903 A1    Mar. 3, 2022

(51) Int. Cl.
*H04W 72/1273*    (2023.01)
*H04W 72/044*    (2023.01)
*H04W 72/23*    (2023.01)

(52) U.S. Cl.
CPC ..... *H04W 72/1273* (2013.01); *H04W 72/046* (2013.01); *H04W 72/23* (2023.01)

(58) Field of Classification Search
None
See application file for complete search history.

(56) References Cited

U.S. PATENT DOCUMENTS

2019/0007931 A1*    1/2019   Harada   ............... H04W 48/08

FOREIGN PATENT DOCUMENTS

| CN | 103378885 A | 10/2013 |
|----|-------------|---------|
| CN | 107666682 A | 2/2018  |

(Continued)

OTHER PUBLICATIONS

3GPP TSG RAN WG1; NTT Docomo, Inc.; Enhancements on multi-TRP/panel transmission teaches (Year: 2018).*

(Continued)

*Primary Examiner* — Shripal K Khajuria
(74) *Attorney, Agent, or Firm* — Arch & Lake LLP

(57) ABSTRACT

The present application relates to the technical field of communications, and relates to a downlink data receiving method and device, a downlink data sending method and device, and a storage medium. The method comprises: a terminal receives first DCI carried on a first PDCCH that is sent by a base station by means of n antenna panels, wherein the first DCI is used for scheduling m antenna panels of the base station to respectively send downlink data to the terminal, m is an integer greater than 1, and n is a positive integer; the terminal determines, according to the first DCI, a target receiving beam used for receiving the downlink data; and the terminal receives the downlink data by means of the target receiving beam. The method solves the problem of downlink scheduling when multiple antenna panels send downlink data.

12 Claims, 9 Drawing Sheets

(56) References Cited

FOREIGN PATENT DOCUMENTS

| | | |
|---|---|---|
| CN | 107852724 A | 3/2018 |
| CN | 107896123 A | 4/2018 |
| CN | 108023629 A | 5/2018 |
| CN | 108282297 A | 7/2018 |
| CN | 108737040 A | 11/2018 |
| CN | 109076378 A | 12/2018 |
| CN | 109076560 A | 12/2018 |
| KR | 20150101750 A | 9/2015 |
| RU | 2676338 C1 | 12/2018 |
| WO | 2017030053 A1 | 2/2017 |
| WO | 2018082520 A1 | 5/2018 |
| WO | 2018128376 A1 | 7/2018 |
| WO | 2018203406 A1 | 11/2018 |

OTHER PUBLICATIONS

Intel Corporation: âDiscussion on multi-TRP/multi-panel transmissionâ 3GPP Draft; R1-1812509 teaches (Year: 2018).*

First Office Action of the Japanese Application No. 2021-539438, issued on Jul. 29, 2022 with English translation,(8p).

Nokia, "On DL Signals and Channels for NR-U", 3GPP TSG RAN WG1 Meeting #95 R1-1812696, Spokane, USA, Nov. 12-16, 2018, (22p).

Xiaomi "SSB transmission in NRU initial access", 3GPP TSG RAN WG1 Meeting #95 R1-1813363, Spokane, USA, Nov. 12-16, 2018, (3p).

International Search Report of PCT Application No. PCT/CN2019/070848 dated Sep. 26, 2019 with English translation (4p).

Samsung, "Enhancements on Multi-Beam Operations", Discussion and Decision, 3GPP TSG RAN WG1 Meeting #95, R1-1813998, Spokane, WA, Nov. 12-26, 2018, (8p).

First Office Action of the Russian Application No. 2021123312, issued on Apr. 6, 2022, (12p).

English translation of the Written Opinion of the International Search Authority in the international application No. PCT/CN2019/070848, mailed on Sep. 26, 2019, (4p).

Intel Corporation. "Discussion on Multi-TRP/Multi-Panel Transmission"3GPP TSG RAN WG1 Meeting #95 R1-1812509, Oct. 16, 2018, (13p).

Nokia, Nokia Shanghai Bell. "Enhancements on Multi-TRP/Panel Transmission"3GPP TSG RAN WG1 Meeting #95 R1-1813489, Nov. 2, 2018, (15p).

First Office Action of the Chinese Application No. 201980000046.4, issued on Sep. 28, 2020, (13p).

Second Office Action of the Chinese Application No. 201980000046.4, issued on Apr. 13, 2021., (15p).

NTT Docomo, Inc., "Enhancements on Multi-TRP/Panel Transmission", Discussion and Decision, 3GPP TSG RAN WG1 Meeting #94bis R1-1811348, Chengdu, China, Oct. 8-12, 2018, (21p).

Extended European Search Report in the European Application No. 19908682.8, mailed on Nov. 30, 2021, (7p).

Intel Corporation, "Remaining Issues on Beam Management", 3GPP TSG RAN WG1 Meeting #94 R1-1808669, Gothenburg, Sweden, Aug. 20-24, 2018,(16p).

Nokia, Nokia Shanghai Bell, "On UE adaptation to the traffic", 3GPP TSG RAN WG1 Meeting #95 R1-1813620, Spokane, USA, Nov. 12-16, 2018,(9p).

NTT Docomo, Inc. "Discussion on multi-beam enhancement", 3GPP TSG RAN WG1 Meeting #94bis R1-1811349, Chengdu, China, Oct. 8-12, 2018,(11p).

First Office Action of the Japanese Application No. 2021-539120, issued on Jul. 29, 2022, with English translation, (7p).

Notice-of-Allowance of CN 202111107274.7 dated Mar. 1, 2024, 3 pages.

* cited by examiner

DOWNLINK DATA RECEIVING METHOD AND DEVICE, DOWNLINK DATA SENDING METHOD AND DEVICE, AND STORAGE MEDIUM

CROSS REFERENCE TO RELATED APPLICATION

The present application is the U.S. national phase of PCT Application No. PCT/CN2019/070848 filed on Jan. 8, 2019, which is incorporated herein by reference in its entirety for all purposes.

TECHNICAL FIELD

The present disclosure relates to the field of communication technologies, and particularly, to a method for receiving downlink data, a method for sending downlink data, an apparatus, and a storage medium.

BACKGROUND

In a 5G New Radio (NR) system, a base station and a terminal may transmit and receive information by using a beam. For example, both control signaling and service data that are exchanged between a base station and a terminal may be transmitted and received by using a beam.

In the case where the base station has a plurality of antenna panels, the base station may send downlink data to the terminal through different antenna panels respectively. That is, downlink data is sent to the terminal through different transmission beams respectively. In this case, how the base station schedules the above plurality of antenna panels to send downlink data by using Downlink Control Information (DCI) is an urgent problem to be solved.

SUMMARY

Embodiments of the present disclosure provide a method for receiving downlink data, a method for sending downlink data, an apparatus, and a storage medium. The technical solutions are as follows.

According to a first aspect of the embodiments of the present disclosure, a method receiving downlink data is provided and the method includes the following operations.

A terminal receives first DCI that is carried on a first physical downlink control channel (PDCCH) and sent by a base station through n antenna panels. The first DCI is used for scheduling m antenna panels of the base station to send downlink data to the terminal respectively, and m is an integer greater than 1, and n is a positive integer.

The terminal determines at least one target receiving beam used for receiving the downlink data according to the first DCI.

The terminal receives the downlink data by using the at least one target receiving beam.

Alternatively, the operation that the terminal determines the at least one target receiving beam used for receiving the downlink data according to the first DCI includes the following operations.

The terminal determines a plurality of receiving beams corresponding to the plurality of transmission configuration indication (TCI) states as the at least one target receiving beam according to a plurality of TCI states carried in the first DCI.

Alternatively, the method further includes the following operation.

In response to the terminal being not able to determine the at least one target receiving beam according to the first DCI, the terminal receives the downlink data by using at least one default receiving beam.

Alternatively, the number of the at least one default receiving beam is one or more.

Alternatively, the at least one default receiving beam is at least one receiving beam used by the terminal to receive a second PDCCH. The second PDCCH is a PDCCH, in a latest scheduling unit that receives a PDCCH which is from a same antenna panel as the first PDCCH from, sent by a Control Resource Set (CORESET) with a minimum number in at least one CORESET sent by the same antenna panel.

Alternatively, the at least one default receiving beam is at least one receiving beam used by the terminal to receive the first PDCCH.

Alternatively, the at least one default receiving beam is at least one receiving beam indicated in DCI carried on a latest PDCCH that is sent by using a same CORESET as the first PDCCH being sent by.

Alternatively, a number of CORESETs that are used for sending PDCCHs and are preconfigured by the base station for the terminal is k, and PDCCHs sent by at least two of the k CORESETs are configured to be sent by using different antenna panels, k being an integer greater than 1.

The method further includes the following operations

The terminal receives CORESET configuration information sent by the base station. The CORESET configuration information includes identification information of antenna panels for sending PDCCH by using CORESET.

According to a second aspect of embodiments of the present disclosure, a method for sending downlink data is provided and the method includes the following operations.

A base station sends a first DCI carried on a first PDCCH to a terminal through n antenna panels. The first DCI is used for scheduling m antenna panels of the base station to send downlink data to the terminal respectively, m is an integer greater than 1, and n is a positive integer.

The base station sends the downlink data to the terminal through the m antenna panels respectively.

Alternatively, a plurality of TCI states are carried in the first DCI, and the plurality of TCI states are used for indicating a plurality of receiving beams that correspond to the plurality of TCI states and are used by the terminal for receiving the downlink data.

Alternatively, a number of CORESETs that are used for sending PDCCHs and are preconfigured by the base station for the terminal is k, and k is an integer greater than 1.

The PDCCHs sent by the k CORESETs are configured to be sent by using a same antenna panel.

Alternatively, PDCCHs sent by at least two of the k CORESETs are configured to be sent by using different antenna panels.

Alternatively, the method further includes the following operation.

The base station sends CORESET configuration information to the terminal.

The CORESET configuration information includes identification information of antenna panels for sending PDCCH by using CORESET.

Alternatively, the method further includes the following operation.

The base station sends a MAC signaling to the terminal. The MAC signaling is used for activating a target TCI state. The target TCI state is used for indicating a receiving beam used by the terminal for receiving the first PDCCH.

According to a third aspect of the embodiments of the present disclosure, an apparatus receiving downlink data is provided. The apparatus is applied in a terminal, and the apparatus includes a control information receiving module, a receiving beam determining module and a downlink data receiving module.

The control information receiving module is further configured to receive first DCI that is carried on a first PDCCH and sent by a base station through n antenna panels. The first DCI is used for scheduling m antenna panels of the base station to send downlink data to the terminal respectively, m is an integer greater than 1, and n is a positive integer.

A receiving beam determining module is configured to determine, according to the first DCI, at least one target receiving beam used for receiving the downlink data. A downlink data receiving module is configured to receive the downlink data by using the at least one target receiving beam.

Alternatively, the receiving beam determining module is further configured to determine, according to a plurality of TCI states carried in the first DCI, a plurality of receiving beams corresponding to the plurality of TCI states as the at least one target receiving beam.

Alternatively, the downlink data receiving module is further configured to: in response to the terminal being not able to determine the target receiving beams according to the first DCI, receive the downlink data by using at least one default receiving beam.

Alternatively, a number of the at least one default receiving beam is one or more.

Alternatively, the at least one default receiving beam is at least one receiving beam used by the terminal to receive a second PDCCH. The second PDCCH is a PDCCH, in a latest scheduling unit that receives a PDCCH which is from a same antenna panel as the first PDCCH from, sent by a CORESET with a minimum number in at least one CORESET sent by the same antenna panel.

Alternatively, the at least one default receiving beam is at least one receiving beam used by the terminal to receive the first PDCCH.

Alternatively, the at least one default receiving beam is at least one receiving beam indicated in DCI carried on a latest PDCCH that is sent by using a same CORESET as the first PDCCH being sent by.

Alternatively, a number of CORESETs that are used for sending PDCCHs and are preconfigured by the base station for the terminal is k, and PDCCHs sent by at least two of the k CORESETs are configured to be sent by using different antenna panels, k being an integer greater than 1.

The apparatus further includes a configuration information receiving module.

The configuration information receiving module is configured to receive CORESET configuration information sent by the base station, wherein the CORESET configuration information comprises identification information of antenna panels for sending PDCCH by using CORESET.

According to a fourth aspect of the embodiments of the present disclosure, an apparatus for sending downlink data is provided. The apparatus is applied in a base station and the apparatus includes a control information sending module and a downlink data sending module.

The control information sending module is configured to send first DCI carried on a first PDCCH to a terminal through n antenna panels. The first DCI is used for scheduling m antenna panels of the base station to send downlink data to the terminal respectively, m is an integer greater than 1, and n is a positive integer.

The downlink data sending module is configured to send the downlink data to the terminal through the m antenna panels respectively.

Alternatively, a plurality of TCI states are carried in the first DCI, and the plurality of TCI states are used for indicating a plurality of receiving beams that correspond to the plurality of TCI states and are used by the terminal for receiving the downlink data.

Alternatively, a number of CORESETs that are used for sending PDCCHs and are preconfigured by the base station for the terminal is k, and k is an integer greater than 1.

PDCCHs sent by the k CORESETs are configured to be sent by using a same antenna panel Alternatively, PDCCHs sent by at least two of the k CORESETs are configured to be sent by using different antenna panels.

Alternatively, the apparatus further includes a configuration information sending module.

The configuration information is configured to send CORESET configuration information to the terminal. The CORESET configuration information comprises identification information of antenna panels for sending PDCCH by using CORESET.

Alternatively, the apparatus further includes an activation signaling sending module.

The activation signaling sending module is configured to send a medium MAC signaling to the terminal. The MAC signaling is used for activating a target TCI state, the target TCI state is used for indicating a receiving beam used by the terminal for receiving the first PDCCH.

According to a fifth aspect of the embodiments of the present disclosure, an apparatus for receiving downlink data is provided. The apparatus is applied in a terminal and the apparatus includes a processor; and a memory for storing instructions executable for the processor.

The processor is configured to: receive first DCI that is carried on a first PDCCH and sent by a base station through n antenna panels, wherein the first DCI is used for scheduling m antenna panels of the base station to send downlink data to the terminal respectively, m is an integer greater than 1, and n is a positive integer: determine, according to the first DCI, at least one target receiving beam used for receiving the downlink data; and receive the downlink data by using the at least one target receiving beam.

According to a sixth aspect of the embodiments of the present disclosure, an apparatus for sending downlink data. The apparatus is applied to a base station and the apparatus includes a processor; and a memory for storing instructions executable for the processor.

The processor is configured to: send first DCI carried on a first PDCCH to a terminal through n antenna panels, the first DCI being used for scheduling m antenna panels of the base station to send downlink data to the terminal respectively, m is an integer greater than 1, and n is a positive integer; and send the downlink data to the terminal through the m antenna panels respectively.

According to a seventh aspect of embodiments of the present disclosure, a non-transitory computer readable storage medium in which computer programs are stored is provided. When the computer programs are executed by a processor, the steps of the method of the first aspect are implemented, or the steps of the method of the second aspect are implemented.

The technical solutions provided in the embodiments of the present disclosure may include the following beneficial effects.

When a plurality of antenna panels of the base station need to send downlink data to the terminal respectively, the base station schedules the plurality of antenna panels to send downlink data at the same time through one piece of DCI, and a PDCCH carrying the DCI may be sent to the terminal through one or more antenna panels. In this way, the downlink scheduling problem of sending the downlink data through the plurality of antenna panels is solved.

It should be understood that the above general description and the detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The network architectures and service scenarios described in the embodiments of the present disclosure are intended to illustrate the technical solution of the embodiments of the present disclosure more clearly, and do not constitute a limitation to the technical solution provided by the embodiments of the present disclosure. Those of ordinary skill in the art will know that with the evolution of network architecture and the emergence of new service scenarios, the technical solutions provided by the embodiments of the present disclosure are also applicable to similar technical problems.

Figure 1:
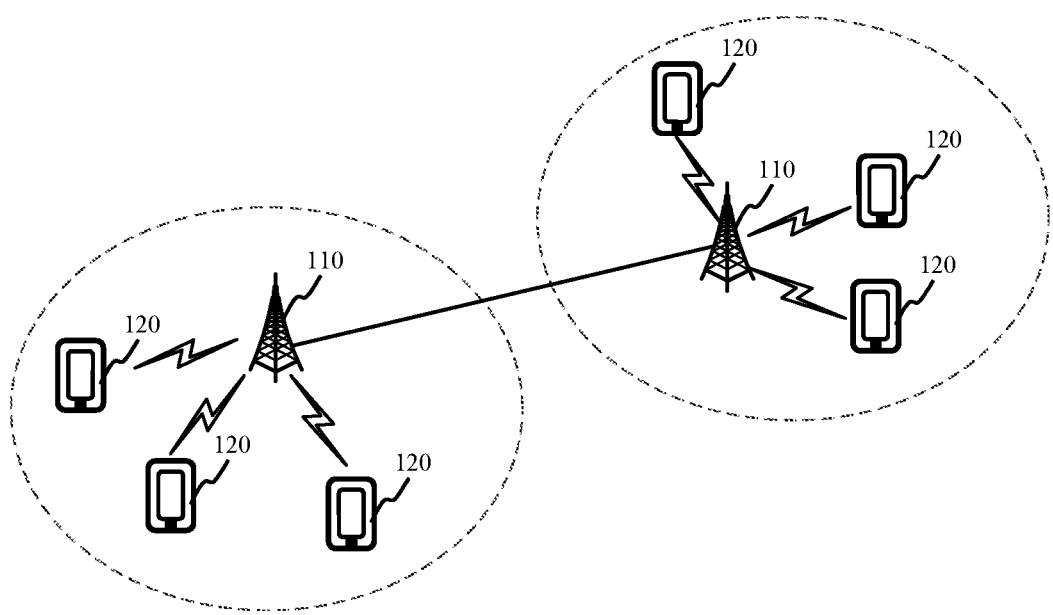
FIG. 1 is a schematic diagram of a network architecture according to an exemplary embodiment.

FIG. 1 is a schematic diagram of a network architecture according to an exemplary embodiment. The network architecture may include a base station 110 and a terminal 120.

The base station 110 is deployed in an access network. The access network in the 5G NR system may be referred to as New Generation-Radio Access Network (NG-RAN). The base station 110 and the terminal 120 communicate with each other via a certain air interface technology, for example, the base station 110 and the terminal 120 may communicate with each other via cellular technology.

Base station 110 is an apparatus deployed in an access network to provide wireless communication functionality for terminal 120. The base station 110 may include various forms of macro stations, micro base stations, relay stations, access points, and the like. In systems employing different radio access technologies, the names of devices having base station functions may be different, for example, referred to as gNodeB or gNB in the 5G NR system. With the evolution of communication technologies, the name "base station" may be changed. For ease of description, the above apparatus for providing a wireless communication function for the terminal 120 in the embodiments of present disclosure is collectively referred to as a base station.

There are usually multiple terminals 120, and one or more terminals 120 may be distributed within a cell managed by each base station 110. The terminal 120 may include various devices having wireless communication function, such as a handheld device, an in-vehicle device, a wearable device, a computing device, or other processing devices connected to a wireless modem, various forms of User Equipments (UEs), Mobile Stations (MSs), terminal devices, and the like. For ease of description, the above devices in the embodiments of present disclosure are collectively referred to as terminals.

The "5G NR system" in the embodiments in the present disclosure may also be referred to as a 5G system or an NR system, but the meaning thereof will be understood by those skilled in the art. The technical solutions described in the embodiments of the present disclosure may be applicable to the 5G NR system, or may be applicable to a subsequent evolution system of the 5G NR system.

When the base station has a plurality of antenna panels, if the communication between the plurality of antenna panels is an ideal backhaul, there is no delay for the interactive communication between the plurality of antenna panels. In this case, the base station tends to send one piece of DCI to the terminal and a plurality of antenna panels are scheduled at the same time through this DCI to send downlink data. In the following, the technical solutions provided by the present disclosure will be described by several embodiments.

Figure 2:
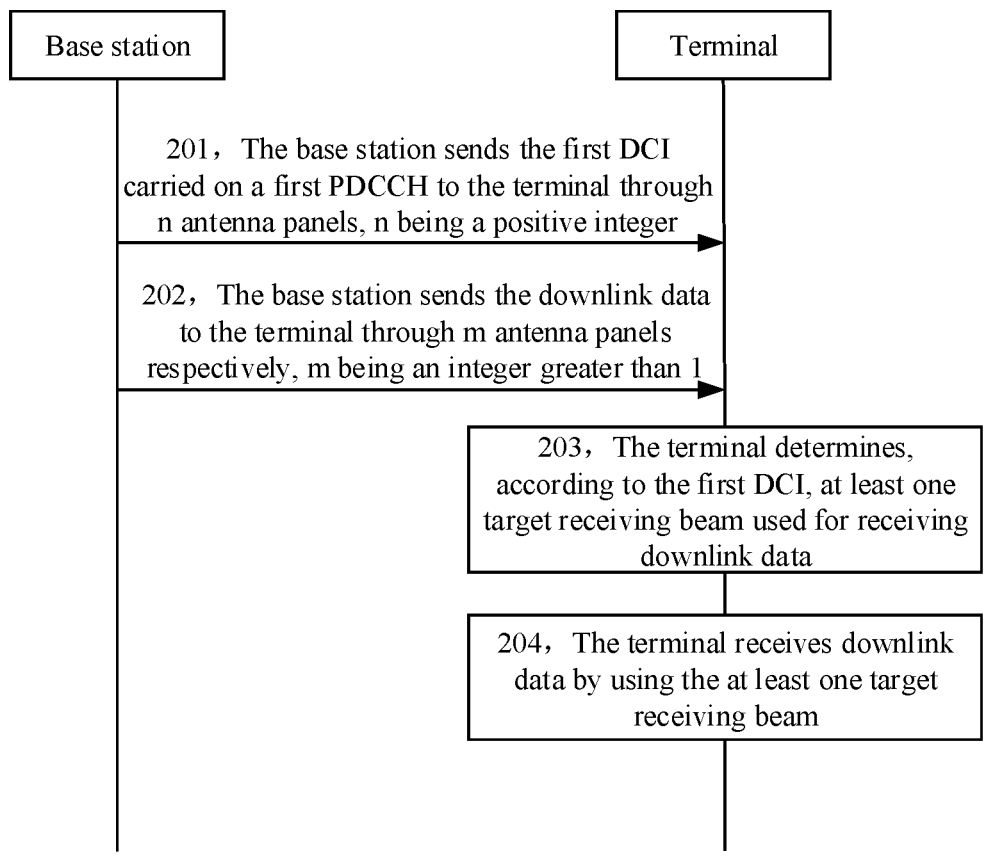
FIG. 2 is a flowchart of a method for receiving downlink data according to an exemplary embodiment.

FIG. 2 is a flowchart of a method for receiving downlink data according to an exemplary embodiment. The method may be applied in the network architecture shown in FIG. 1. The method may include the following operations (201-204).

In operation 201, the base station sends the first DCI carried on a first PDCCH to the terminal through n antenna panels, n being a positive integer.

In the embodiments of present disclosure, the base station has a plurality of antenna panels, and the base station may send downlink data to the terminal through a plurality of antenna panels. The above plurality of antenna panels may belong to a same Transmitter Receiver Point (TRP), or may belong to a plurality of different TRPs. That is, a base station may have one or more TRPs, each TRP may have one or more antenna panels, and different antenna panels correspond to different beam directions.

In the embodiments of the present disclosure, the first DCI is used for scheduling m antenna panels of the base station to send downlink data to the terminal respectively, and m is an integer greater than 1. That is, the base station schedules a plurality of antenna panels at the same time through one piece of DCI to send downlink data to the terminal. The base station may send the first DCI carried on the first PDCCH to the terminal through an antenna panel, or may send the first DCI carried on the first PDCCH to the terminal through a plurality of antenna panels.

Alternatively, the first DCI carries receiving beam indication information. The receiving beam indication information is used to indicate at least one target receiving beam used for receiving downlink data. For example, the receiving beam indication information is transmission configuration indication (TCI) states. When the first DCI includes the TCI states, the base station notifies, through the first DCI, the terminal the TCI states used for scheduling a Physical Downlink Shared Channel (PDSCH). That is, when the terminal is informed to receive the downlink data on the PDSCH, the receiving beams to be used should be the same as the receiving beams used for receiving the reference signaling (RS) corresponding to the TCI states. Thereafter, the terminal may receive downlink data on the PDSCH by using the above determined target receiving beam. Certainly, in some other possible cases, the first DCI may not include the receiving beam indication information, for example, merely include the time-frequency resource indication information, and the time-frequency resource indication information is used for indicating the time-frequency resource location corresponding to the downlink data.

In the embodiments of the present disclosure, since the base station sends downlink data to the terminal through a plurality of antenna panels respectively, the first DCI sent by the base station to the terminal may carry a plurality of TCI states, so that the terminal determines a plurality of target receiving beams according to the plurality of TCI states to receive above downlink data sent by the plurality of antenna panels respectively.

In addition, before receiving the first PDCCH sent by the base station, the terminal needs to determine a receiving beam for receiving the first PDCCH firstly. The terminal may determine the receiving beam for the first PDCCH through the following manner.

The base station configures a plurality of TCI states for the terminal through RRC signaling, each TCI state corresponds to one RS respectively, and different TCI states correspond to different RSs. The correspondence between the TCI states and the RSs may be shown in Table-1. Here, the reference signal identifier is an RS identifier, also referred to as RS index, and it is used for indicating the RS uniquely. Different RSs correspond to different identifier information. In the embodiments of present disclosure, the RS may be Non-Zero Power Channel State Information Reference Signal (NZP CSI-RS), Synchronization Signal Block (SSB), or other reference signal which is not limited in the embodiments of present disclosure.

TABLE 1

| TCI states identifier | Reference signal identifier |
|---|---|
| TCI#0 | SSB index#1 |
| TCI#1 | SSB index#2 |
| TCI#2 | CSI-RS index#5 |
| TCI#3 | CSI-RS index#6 |
| TCI#4 | SSB index#3 |
| . . . . . . | . . . . . . |

Then, the base station sends MAC signaling to the terminal. The MAC signaling is used for activating a target TCI state. The target TCI state is used for indicating a receiving beam used by the terminal for receiving the first PDCCH. The above target TCI state may be one of a plurality of TCI states configured by the base station for the terminal, or may be a plurality of TCI states. After receiving the MAC signaling, the terminal may determine the receiving beam used for receiving the RS corresponding to the target TCI state according to the correspondence between the TCI states and the RSs, so that the terminal may receive the first PDCCH by using the above determined receiving beam. For example, when the target TCI state is TCI #1, according to Table-1, it may be learned that the RS corresponding to TCI #1 is SSB index #2, and the terminal may receive the first PDCCH by using the receiving beam used for receiving the SSB index #2.

For example, it is assumed that the base station sends the first PDCCH by using the Panel #0), the MAC signaling activates one of the TCI states when the terminal receives the first PDCCH sent by the Panel #(as the target TCI state, for example, the TCI #0). According to Table-1, it may be learned that the RS corresponding to the TCI #0) is SSB index #1, and the terminal may use the receiving beam used for receiving the SSB index #1 as the receiving beam used for receiving the first PDCCH. If the base station then sends the first PDCCH by using the Panel #1, the MAC signaling activates one of the TCI states when the terminal receives the first PDCCH sent by the Panel #1 as the target TCI state, and simultaneously deactivates one of the TCI states when the terminal receives the first PDCCH sent by the Panel #0. If the base station then sends the first PDCCH by using the Panel #0) and the Panel #1, the terminal activates one of the TCI states when the terminal receives the first PDCCH sent by the Panel #0 and simultaneously activates one of the TCI states when the terminal receives the first PDCCH sent by the Panel #1.

In operation 202, the base station sends the downlink data to the terminal through m antenna panels respectively, m being an integer greater than 1.

For example, the base station has two antenna panels, which are Panel #0 and Panel #1 respectively: The base station sends the first downlink data to the terminal through the Panel #0 and sends the second downlink data to the terminal through the Panel #1.

The above mentioned downlink data may be service data, and the service data refers to data related to the service. For different services, the contents of the service data may also be different.

In operation 203, the terminal determines, according to the first DCI, at least one target receiving beam used for receiving downlink data.

When the first DCI includes a plurality of TCI states, the base station informs the terminal of the TCI states used for scheduling the PDSCH through the first DCI. The terminal determines a plurality of receiving beams corresponding to the plurality of TCI states as the target receiving beams according to the plurality of TCI states carried in the first DCI.

For example, it is assumed that the first DCI includes two TCI states, such as TCI #0 and TCI #1. According to Table-1, it may be learned that the RS corresponds to the TCI #0) is SSB index #1 and the RS corresponds to TCI #1 is SSB index #2. The terminal may use the receiving beams used for receiving the SSB index #1 and SSB index #2 as the target receiving beams.

In operation 204, the terminal receives downlink data by using the at least one target receiving beam.

After the terminal determines the at least one target receiving beam, the terminal may use the at least one target receiving beam to receive downlink data sent by the base station.

In conclusion, in the technical solutions provided in the embodiments of the present disclosure, when a plurality of antenna panels of a base station needs to send downlink data to a terminal respectively, the base station schedules the plurality of antenna panels to send the downlink data at the same time through one piece of DCI, and a PDCCH carrying the DCI may be sent to the terminal through one or more antenna panels. In this way, the downlink scheduling problem of sending downlink data through the plurality of antenna panels is solved.

In addition, a plurality of TCI states are carried in the DCI, so that the terminal is able to determine a plurality of target receiving beams to receive above downlink data sent by the plurality of antenna panels according to the plurality of TCI states, thereby ensuring a success rate of receiving downlink data.

Figure 3:
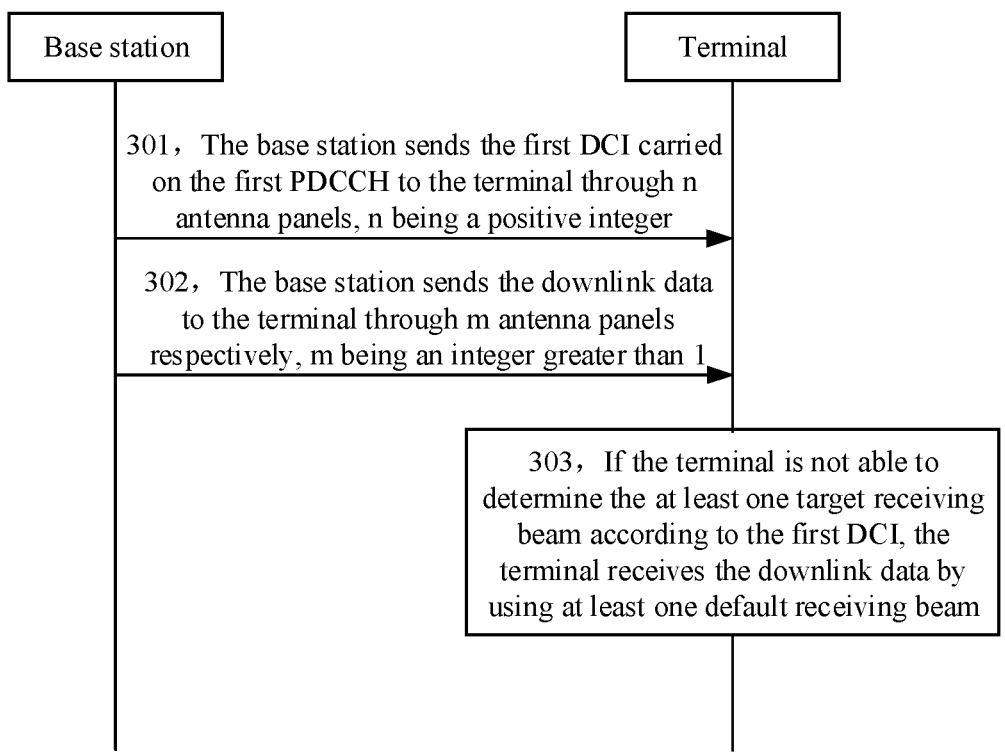
FIG. 3 is a flowchart of a method for receiving downlink data according to another exemplary embodiment.

FIG. 3 is a flowchart of a method for receiving downlink data according to another exemplary embodiment. The method may be applied in the network architecture shown in FIG. 1. The method may include the following operations (301-303).

In operation 301, the base station sends the first DCI carried on the first PDCCH to the terminal through n antenna panels, n being a positive integer.

In operation 302, the base station sends the downlink data to the terminal through m antenna panels respectively, m being an integer greater than 1.

The above operations 301-302 are the same as or similar to the operations 201-202 in the embodiment of FIG. 2. For details, reference may be made to the description in the embodiment of FIG. 2, and details are not described in this embodiment.

In addition, as described in the embodiment of FIG. 2, after receiving the first DCI carried on the first PDCCH, the terminal determines the at least one target receiving beam used for receiving downlink data according to the first DCI, and then receives the downlink data by using the at least one target receiving beam. In some cases, if the terminal is not able to determine the at least one target receiving beam according to the first DCI, the terminal performs the following operation 303.

In operation 303, if the terminal is not able to determine the at least one target receiving beam according to the first DCI, the terminal receives the downlink data by using at least one default receiving beam.

The terminal is not able to determine the target receiving beams according to the first DCI, includes, but not limited to, the following two cases: (1) the first DCI do not include receiving beam indication information, that is, the terminal cannot parse the at least one target receiving beam used for receiving downlink data from the first DCI after receiving the first DCI: (2) the time interval between receiving of the first DCI by the terminal and receiving the downlink data by the terminal is less than the preset duration, that is, the terminal cannot parse the receiving beam indication information in the first DCI in time, so that the terminal is not able to determine the at least one target receiving beam used for receiving the downlink data.

The number of at least one default receiving beam may be one or more. The terminal may determine the at least one default receiving beam by using the following manners (including the first manner~ the third manner 3 described below).

Manner 1: the at least one default receiving beam is at least one receiving beam used by the terminal to receive a second PDCCH.

The second PDCCH is a PDCCH, in a latest scheduling unit that receives a PDCCH which is from a same antenna panel as the first PDCCH from, sent by a Control Resource Set (CORESET) with a minimum number in at least one CORESET sent by the same antenna panel.

The above scheduling unit may be a minimum scheduling unit divided from the time domain. For example, the scheduling unit is a slot or a mini-slot. When all the CORESETs are used for sending PDCCHs through a same antenna panel, a number of a CORESET is used to identify the CORESET uniquely, and different CORESETs have different numbers. When all the CORESETs may be used for sending PDCCHs through different antenna panels, the antenna panel identifiers to which the CORESET belongs needs to be added in the CORESET configuration attribute, and different CORESETs with a same antenna panel identifier have different numbers. Different CORESETs with different antenna panel identifiers may have a same number. For example, the numbers of the CORESETs used for sending PDCCH through the antenna panel panel #0 may be CORESET #0), CORESET #1, CORESET #2. The numbers of the CORESETS used for sending PDCCH through the antenna panel panel #1 may also be CORESET #0, CORESET #1, CORESET #2 However, the antenna panel identifiers of the CORESETs of the two antenna panels are different.

In one example, three CORESETs used for sending PDCCHs are configured by the base station for the terminal, and the three CORESETs are CORESET #0 CORESET #1, and CORESET #2, respectively. The base station has the following two antenna panels: Panel #0 and Panel #1. The first PDCCH is sent by Panel #0). Therefore, the terminal needs to find the second PDCCH, in a latest scheduling unit that receives a PDCCH which is from Panel #0, sent by a CORESET with a minimum number sent by the Panel #0). Illustratively, if a PDCCH is sent merely through CORESET #2 by the Panel #0 in the latest scheduling unit that receives a PDCCH which is from Panel #0 the terminal determines the PDCCH sent through the CORESET #2 by the Panel #0 as the second PDCCH, and uses the receiving beam that receives the second PDCCH as the default receiving beam. If the PDCCH is sent merely through the CORESET #0 by the Panel #0) in the latest scheduling unit that receives a PDCCH which is from Panel #0 the terminal determines the PDCCH sent through the CORESET #0 by the Panel #0 as the second PDCCH, and uses the receiving beam that receives the second PDCCH as the default receiving beam. If the PDCCH is sent through the CORESET #0 and the CORESET #2 by the Panel #0 in the latest scheduling unit that receives a PDCCH which is from Panel #0 the terminal determines the PDCCH sent through the CORESET #0 by the Panel #0 as the second PDCCH, and uses the receiving beam that receives the second PDCCH as the default receiving beam.

In another example, three CORESETs used for sending PDCCHs are configured by the base station for the terminal, and the three CORESETs are CORESET #0 CORESET #1, and CORESET #2, respectively. The base station has the following two antenna panels: Panel #0 and Panel #1. The first PDCCH is sent by Panel #0 and Panel #1. Therefore, the terminal needs to find the second PDCCH, in a latest scheduling unit that receives a PDCCH which is from Panel #0 or Panel #1, sent through a CORESET with a minimum number by the Panel #0 or Panel #1. Illustratively, if a PDCCH is sent through CORESET #2 by the Panel #0 in the latest scheduling unit that receives a PDCCH which is from Panel #0 or Panel #1, the terminal determines the PDCCH sent through the CORESET #2 by the Panel #0 as the second PDCCH, and uses the receiving beam that receives the second PDCCH as the default receiving beam. If the PDCCH is sent through the CORESET #0 by the Panel #1 in the latest scheduling unit that receives a PDCCH which is from Panel #0) or Panel #1, the terminal determines the PDCCH sent through the CORESET #0 by the Panel #1 as the second PDCCH, and uses the receiving beam that receives the second PDCCH as the default receiving beam. If PDCCH #1 sent through the CORESET #0 by the Panel #0 or the Panel #1 and PDCCH #2 sent through the CORESET #1 by the Panel #0 or the Panel #1 are existed in the latest scheduling unit that receives a PDCCH which is from Panel #0) or Panel #1, the terminal determines the PDCCH #1 as the second PDCCH and uses the receiving beam that receives the second PDCCH as the default receiving beam. If PDCCH #3 sent through the CORESET #0) by the Panel #0) and PDCCH #4 sent through the CORESET #1 by the Panel #1 are existed in the latest scheduling unit that receives a PDCCH which is from Panel #0) or Panel #1, the terminal determines the PDCCH #3 as the second PDCCH and uses the receiving beam that receives the second PDCCH as the default receiving beam.

Manner 2: the at least one default receiving beam is the at least one receiving beam used by the terminal to receive the first PDCCH.

For example, the base station has two antenna panels: Panel #0 and Panel #1. The first PDCCH is sent by Panel #0). The receiving beam used by the terminal to receive the first PDCCH is the receiving beam 1, and the receiving beam 1 is determined by the terminal as the default receiving beam.

For another example, the base station has two antenna panels: Panel #0 and Panel #1, the first PDCCH is sent by the Panel #0 and Panel #1. The receiving beams used by the terminal to receive the first PDCCH are the receiving beam 1 and the receiving beam 2, and the receiving beam 1 and the receiving beam 2 are determined by the terminal as default receiving beams.

Manner 3: the at least one default receiving beam is at least one receiving beam indicated in DCI carried on a latest PDCCH that is sent by using a same CORESET as the first PDCCH being sent by.

The DCI in the latest PDCCH may be another DCI received latest from the base station for scheduling downlink data within a history time before the terminal receives the first DCI. The latest DCI may include one or more TCI states. The terminal determines receiving beams corresponding to all TCI states included in the latest DCI as default receiving beams.

In conclusion, in the technical solutions provided in the embodiments of the present disclosure, after the terminal receives the first DCI used for scheduling downlink data sent by the base station, if the terminal is not able to determine the at least one target receiving beam used for receiving the downlink data according to the first DCI, at least one default receiving beam is selected by the terminal to receive the downlink data, thereby implementing the receiving of the downlink data.

In addition, in the technical solutions provided in the embodiments of the present disclosure, a plurality of manners for determining a default receiving beam are provided, so that a terminal can select an accurate default receiving beam to receive downlink data, thereby improving accuracy of receiving downlink data by the terminal.

In some optional embodiments provided based on the above embodiment of FIG. 3, a plurality of CORESETs used for sending PDCCH carrying DCI is preconfigured by the base station for the terminal. A uniform sending panel may be configured by the base station for the above plurality of CORESETs. or non-uniform sending panels are configured for the above plurality of CORESETs. For the two cases, the manners for determining the default receiving beam by the terminal are different.

In a first case, a plurality of CORESETs used for sending PDCCH carrying DCI is preconfigured by the base station for the terminal, and a uniform sending panel is configured by the base station for the above plurality of CORESETs.

For example, the number of CORESETs that are used for sending PDCCHs and are preconfigured by the base station for the terminal is k, and k is an integer greater than 1. The PDCCHs sent by the k CORESETs are configured to be sent by using a same antenna panel.

In a possible embodiment, the PDCCHs sent by the k CORESETs are configured to be sent by using a same antenna panel. For example, three CORESETs are configured by the base station for the terminal, such as CORESET #0), CORESET #1, and CORESET #2. The PDCCHs sent by the three CORESETs are all configured to be sent by using Panel #0). In this way, the first PDCCH carrying the first DCI is sent through the Panel #0 by the base station to the terminal. The first DCI is used for scheduling a plurality of antenna panels of the base station to send downlink data to the terminal respectively.

In this case, since the downlink data is sent by a plurality of antenna panels, the receiving beam indication information carried in the first DCI may indicate a plurality of target receiving beams. For example, the first DCI carries a plurality of TCI states, so that the terminal determines a plurality of target receiving beams for receiving the downlink data respectively sent by a plurality of antenna panels according to the plurality of TCI states.

However, when the terminal is not able to determine the target receiving beam according to the first DCI, the terminal may receive the downlink data by using at least one default receiving beam. In this configuration, since the first PDCCH sent by the base station to the terminal is sent by one antenna panel, the number of the receiving beams used by the terminal to receive the first PDCCH is usually one. Therefore, when the terminal determines the at least one default receiving beam by using the above first manner and the second manner, the number of at least one default receiving beam is also one.

For example, if the terminal determines the default receiving beam by using the above first manner, the above example is still used for explanation. Since the PDCCHs sent by the CORESET #0 the CORESET #1, and the CORESET #2 are all configured to be sent by using the Panel #0 after the terminal finds the latest scheduling unit that receives the PDCCH, and a PDCCH, in the scheduling unit, sent by a CORESET with a minimum number is further found to be the second PDCCH, and then the terminal uses the receiving beam receiving the second PDCCH as the default receiving beam. For example, if the terminal receives the second PDCCH by using the receiving beam 1, the receiving beam 1 is determined by the terminal as the default receiving beam, and downlink data is received by using the receiving beam 1 subsequently.

For another example, if the terminal determines the default receiving beam by using the above second manner, the above example is still used for explanation. Since the PDCCHs sent by the CORESET #0), the CORESET #1, and the CORESET #2 are all configured to be sent by using the Panel #0, the first PDCCH is also sent by the Panel #0. If the terminal receives the first PDCCH by using the receiving beam 2, the receiving beam 2 is determined by the terminal as the default receiving beam, and downlink data is received by using the receiving beam 2 subsequently.

In another possible embodiment, the PDCCHs sent by the k CORESET are configured to be sent by using the same multiple antenna panels. For example, three CORESETs are configured by the base station for the terminal, such as CORESET #0), CORESET #1, and CORESET #2. The PDCCHs sent by the three CORESETs are configured to be sent by using Panel #0 and Panel #1. In this way, a first PDCCH carrying first DCI is sent through the Panel #0 and the Panel #1 by the base station to the terminal. The first DCI is used for scheduling a plurality of antenna panels of the base station to send downlink data to the terminal respectively.

When the terminal is not able to determine the at least one target receiving beam according to the first DCI, the terminal may receive the downlink data by using the at least one default receiving beam. In this configuration, since the first PDCCH sent by the base station to the terminal is sent by the same multiple antenna panels, the number of receiving beams used by the terminal to receive the first PDCCH is usually more than one. Therefore, when the terminal determines the at least one default receiving beam by using the above first manner and the second manner, the number of the at least one default receiving beam is also more than one.

For example, if the terminal determines the at least one default receiving beam by using the above first manner, the above example is still used for explanation. Since the PDCCHs sent by the CORESET #0, the CORESET #1, and the CORESET #2 are all configured to be sent by using the Panel #0 and the Panel #1, after the terminal finds the latest scheduling unit that receives the PDCCHs, a PDCCH, in the scheduling unit, sent by a CORESET with a minimum number, is further found to be the second PDCCH, and then the terminal uses the receiving beam receiving the second PDCCH as the default receiving beam. For example, if the terminal receives the second PDCCH by using the receiving beam 1 and the receiving beam 2, the receiving beam 1 and the receiving beam 2 are determined by the terminal as default receiving beams, and downlink data is received by using the receiving beam 1 and the receiving beam 2 subsequently.

For another example, if the terminal determines the at least one default receiving beam by using the above second manner, the above example is still used for explanation. Since the PDCCHs sent by the CORESET #0), the CORESET #1, and the CORESET #2 are all configured to be sent by using the Panel #0 and the Panel #1, the first PDCCH is also sent by the Panel #0) and the Panel #1. If the terminal receives the first PDCCH by using the receiving beam 1 and the receiving beam 2, the receiving beam 1 and the receiving beam 2 are determined by the terminal as the default receiving beams, and downlink data is received by using the receiving beam 1 and the receiving beam 2 subsequently:

In a second case, a plurality of CORESETs used for sending PDCCH is preconfigured by the base station for the terminal, and non-uniform sending panels are configured by the base station for the above plurality of CORESETs.

For example, the number of CORESETs that are used for sending PDCCHs and are preconfigured by the base station for the terminal is k, and k is an integer greater than 1. PDCCHs sent by at least two of the k CORESETs are configured to be sent by using different antenna panels.

In a possible embodiment, in the above k CORESETs, the PDCCH sent by the target CORESET for sending the first PDCCH carrying the first DCI is configured to be sent by using one antenna panel. The first DCI is used for scheduling a plurality of antenna panels of the base station to send downlink data to the terminal respectively. For example, three CORESETs are configured by the base station for the terminal, such as CORESET #0), CORESET #1, and CORESET #2. The base station sends the first PDCCH by using the CORESET #1. The PDCCH sent by the CORESET #1 is configured to be sent by using the Panel #1. In addition, the Panel #1 is further configured to send a PDCCH sent by using the CORESET #0 and the Panel #0 is further configured to send a PDCCH sent by using the CORESET #2.

In this case, since the downlink data is sent by a plurality of antenna panels, the receiving beam indication information carried in the first DCI may indicate a plurality of target receiving beams. For example, the first DCI carries a plurality of TCI states, so that the terminal determines a plurality of target receiving beams to receive the downlink data respectively sent by a plurality of antenna panels according to the plurality of TCI states.

However, when the terminal is not able to determine the target receiving beam according to the first DCI, the terminal may receive the downlink data by using the at least one default receiving beam. In this configuration, since the first PDCCH sent by the base station to the terminal is sent by one antenna panel, the number of the receiving beams used by the terminal to receive the first PDCCH is usually one. Therefore, when the terminal determines the at least one default receiving beam by using the above first manner and the second manner, the number of the at least one default receiving beam is also one.

For example, if the terminal determines the at least one default receiving beam by using the above first manner, the above example is still used for explanation. Since the configurations of all CORESET are not uniform, the terminal needs to determine a target antenna panel used by the base station to send the first PDCCH firstly, and then find a PUCCH, in the latest scheduling unit that receives a PDCCH which is from the target antenna panel, sent by using a CORESET with a minimum number and through the target antenna panel as the second PDCCH, and then the terminal uses the receiving beam receiving the second PDCCH as the default receiving beam. For example, if the terminal receives the second PDCCH by using the receiving beam 1, the receiving beam 1 is determined by the terminal as the default receiving beam, and downlink data is received by using the receiving beam 1 subsequently.

Optionally, a manner in which the terminal determines the target antenna panel used by the base station to send the first PDCCH includes, but is not limited to, any one of the following manners.

1. The terminal determines the target CORESET used by the first PDCCH, and determines the antenna panel corresponding to the target CORESET as the target antenna panel used by the base station to send the first PDCCH according to the CORESET configuration information.

The terminal may determine, based on the time-frequency resource location occupied by the first PDCCH, the CORESET used by the base station when sending the first PDCCH. That is, the target CORESET used by the first PDCCH is determined. In the present embodiment, the CORESET configuration information includes identification information of antenna panels for sending PDCCH by use of CORESET. The identification information of the antenna panel is used to uniquely identify the antenna panel, and different antenna panels have different identification information. Optionally, the CORESET configuration information includes a correspondence between at least one set of CORESETs and the antenna panels.

It is still explained in the above example that three CORESETs used for sending the PDCCH are configured by the base station for the terminal. The three CORESETs are CORESET #0 CORESET #1, and CORESET #2, respectively. The CORESET configuration information sent by the base station to the terminal may include the following contents: {CORESET #0). Panel #1}. {CORESET #1. Panel #1}, and {CORESET #2. Panel #0)}. The above CORESET configuration information indicates that Panel #1 sends the PDCCH to the terminal by using CORESET #0 and the CORESET #1, and the Panel #0 sends the PDCCH to the terminal by using CORESET #2. It is assumed that the terminal determines, according to the CORESET configuration information, that the first PDCCH is from the CORESET #1. Then the terminal may further determine that the first PDCCH is sent by the Panel #1.

2. The terminal determines the target antenna panel used by the base station to send the first PDCCH according to the antenna panel indication information carried in the first DCI.

The antenna panel indication information is used to indicate a target antenna panel used by the base station for sending the first PDCCH. The terminal can directly learn the target antenna panel used by the base station for sending the first PDCCH according to the antenna panel indication information in the first DCI.

For another example, if the terminal determines the default receiving beam by using the above second manner, the above example is still used for explanation. If the terminal receives the first PDCCH by using the receiving beam 2, the receiving beam 2 is determined by the terminal as the default receiving beam, and downlink data is received by using the receiving beam 2 subsequently:

In another possible embodiment, in the above the k CORESETs, the PDCCH configured to be sent by a target CORESET sending the first PDCCH carrying the first DCI is configured to be sent by using a plurality of antenna panels. The first DCI is used for scheduling a plurality of antenna panels of the base station to send downlink data to the terminal respectively. For example, three CORESETs, such as CORESET #0. CORESET #1, and CORESET #2, are configured by the base station for the UE, . . . . The base station sends the first PDCCH by using the CORESET #1. The PDCCH sent by the CORESET #1 is configured to be sent by using Panel #0 and Panel #1. In addition, the Panel #0 and the Panel #1 are further configured to send a PDCCH sent by using the CORESET #0), and the Panel #2 is further configured to send a PDCCH which is to be sent by using the CORESET #2.

When the terminal is not able to determine the at least one target receiving beam according to the first DCI, the terminal may receive the downlink data by using the at least one default receiving beam. In this case of configuration, since the first PDCCH sent by the base station to the terminal is sent by a plurality of antenna panels, the number of receiving beams used by the terminal for receiving the first PDCCH is usually more than one. Therefore, when the terminal determines the default receiving beams by using the above first manner and the second manner, the number of default receiving beams is also more than one.

For example, if the terminal determines the at least one default receiving beam by using the above first manner, the above example is still used for explanation. Since the configurations of CORESETs are not uniform, the terminal needs to determine the target antenna panel used by the base station for sending the first PDCCH firstly, and then find a PUCCH, in the latest scheduling unit that receives a PDCCH which is from the target antenna panel, sent by using a CORESET with a minimum number and through the target antenna panel as the second PDCCH, and then the terminal uses the receiving beam receiving the second PDCCH as the default receiving beam. For example, if the terminal receives the second PDCCH by using the receiving beam 1 and the receiving beam 2, the receiving beam 1 and the receiving beam 2 are determined by the terminal as default receiving beams, and downlink data is received by using the receiving beam 1 and the receiving beam 2 subsequently. In addition, a manner in which the terminal determines the target antenna panel used by the base station for sending the first PDCCH is described above, and details are not described herein.

For another example, if the terminal determines the at least one default receiving beam by using the above second manner, the above example is still used for explanation. If the terminal receives the first PDCCH by using the receiving beam 1 and the receiving beam 2, the receiving beam 1 and the receiving beam 2 are determined by the terminal as the default receiving beams, and the downlink data is received by using the receiving beam 1 and the receiving beam 2 subsequently.

In conclusion, when the terminal determines the at least one default receiving beam by using the above first manner and second manner, the number of the at least one default receiving beam is related to the number of the receiving beams used by the terminal for receiving the first PDCCH. If the number of the receiving beams used by the terminal for receiving the first PDCCH is one, one default receiving beam is determined by the terminal. If the number of the receiving beams used by the terminal for receiving the first PDCCH is more than one, multiple default receiving beams are determined by the terminal.

In addition, in the case where a plurality of CORESETs used for sending PDCCHs are preconfigured by the base station for the terminal, if a uniform sending panel is configured by the base station for the plurality of CORESETs, the terminal does not need to determine the antenna panel used by the base station for sending the first PDCCH when determining the at least one default receiving beam by using the first manner. If non-uniform sending panels are configured by the base station for the plurality of CORESETs, when determining the at least one default receiving beam by using the first manner, the terminal further needs to determine the antenna panel used by the base station for sending the first PDCCH. The terminal may determine the antenna panel used by the base station for sending the first PDCCH according to the CORESET configuration information or the antenna panel indication information carried in the first DCI.

The following are apparatus embodiments of the present disclosure, which may be used to perform the method embodiments of the present disclosure. For details not disclosed in the apparatus embodiments of present disclosure, reference is made to the method embodiments of present disclosure.

Figure 4:
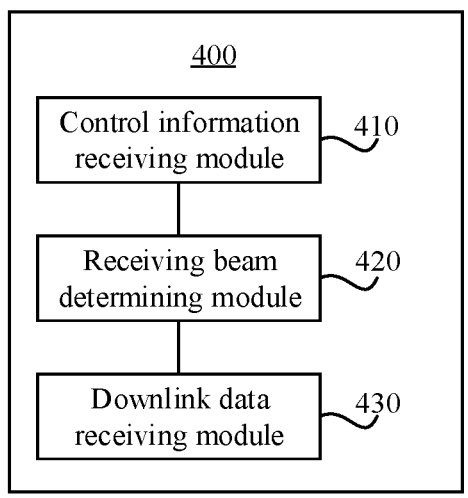
FIG. 4 is a block diagram of an apparatus for receiving downlink data according to an exemplary embodiment.

FIG. 4 is a block diagram of an apparatus for receiving downlink data according to an exemplary embodiment. The apparatus has a function of achieving the above method example on the terminal side, and the function may be implemented by hardware, or may be implemented by executing corresponding software by hardware. The apparatus may be a terminal described above, or may be set in the terminal. The apparatus 400 may include a control information receiving module 410, a receiving beam determining module 420, and a downlink data receiving module 430.

The control information receiving module 410 is configured to receive first DCI that is carried on a first PDCCH and sent by a base station through n antenna panels, the first DCI being used for scheduling m antenna panels of the base station to send downlink data to the terminal respectively, m being an integer greater than 1, and n being a positive integer.

The receiving beam determining module 420 is configured to determine, according to the first DCI, at least one target receiving beam used for receiving the downlink data.

The downlink data receiving module 430 is configured to receive the downlink data by using the at least one target receiving beam.

In conclusion, in the technical solutions provided in the embodiments of the present disclosure, when a plurality of antenna panels of a base station need to send downlink data to a terminal respectively, the base station schedules the plurality of antenna panels to send the downlink data at the same time through one piece of DCI, and a PDCCH carrying the DCI may be sent to the terminal through one or more antenna panels. In this way, the downlink scheduling problem when downlink data is sent through the plurality of antenna panels is solved.

In an alternative embodiment provided based on the embodiment of FIG. 4, the receiving beam determining module 420 is configured to determine, according to a plurality of TCI states carried in the first DCI, a plurality of receiving beams corresponding to the plurality of TCI states as the target receiving beams.

In another alternative embodiment provided based on the embodiment of FIG. 4, the downlink data receiving module 430 is further configured to: when the terminal is not able to determine the at least one target receiving beam according to the first DCI, receive the downlink data by using at least one default receiving beam.

Alternatively, a number of the at least one default receiving beam is one or more.

Alternatively, the at least one default receiving beam is at least one receiving beam used by the terminal to receive a second PDCCH. The second PDCCH is a PDCCH, in a latest scheduling unit that receives a PDCCH which is from a same antenna panel as the first PDCCH from, sent by a CORESET with a minimum number in at least one CORESET sent by the same antenna panel.

Alternatively, the at least one default receiving beam is at least one receiving beam used by the terminal to receive the first PDCCH.

Alternatively, the at least one default receiving beam is at least one receiving beam indicated in DCI carried on a latest PDCCH that is sent by using a same CORESET as the first PDCCH being sent by.

Alternatively, a number of CORESETs that are used for sending PDCCHs and are preconfigured by the base station for the terminal is k, and PDCCHs sent by at least two of the k CORESETs are configured to be sent by using different antenna panels, k being an integer greater than 1.

Figure 5:
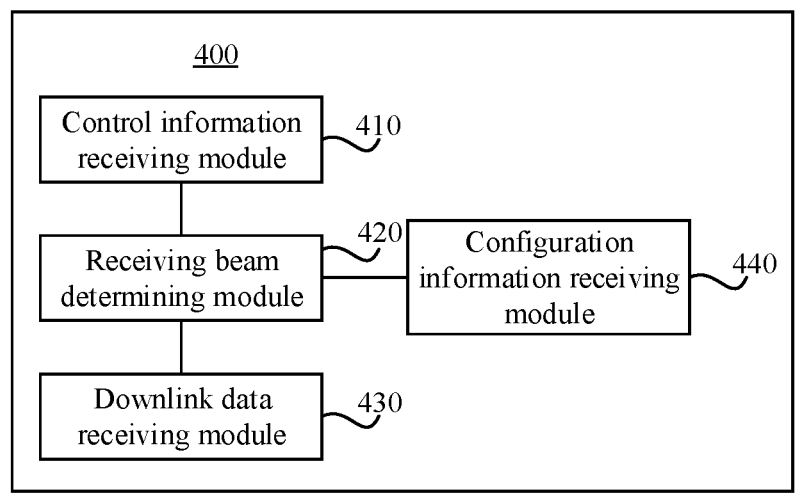
FIG. 5 is a block diagram of an apparatus for receiving downlink data according to another exemplary embodiment.

As shown in FIG. 5, the apparatus 400 further includes a configuration information receiving module 440.

The configuration information receiving module 440 is configured to receive CORESET configuration information sent by the base station. The CORESET configuration information includes identification information of antenna panels for sending PDCCH by using CORESET.

Figure 6:
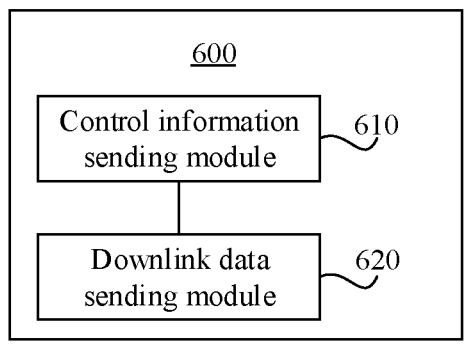
FIG. 6 is a block diagram of an apparatus for sending downlink data according to an exemplary embodiment.

FIG. 6 is a block diagram of an apparatus for sending downlink data according to an exemplary embodiment. The apparatus has a function of achieving the above example of the method on the base station side, and the function may be implemented by hardware, or may be implemented by executing corresponding software by hardware. The apparatus may be a base station described above, or may be set in a base station. The apparatus 600 may include a control information sending module 610 and a downlink data sending module 620.

The control information sending module 610 is configured to send first DCI carried on a first PDCCH to a terminal through n antenna panels. The first DCI is used for scheduling m antenna panels of the base station to send downlink data to the terminal respectively, m is an integer greater than 1, and n is a positive integer.

The downlink data sending module 620 is configured to send the downlink data to the terminal through the m antenna panels respectively.

In conclusion, in the technical solutions provided in the embodiments of the present disclosure, when a plurality of antenna panels of a base station need to send downlink data to a terminal respectively, the base station schedules the plurality of antenna panels to send the downlink data at the same time through one piece of DCI, and a PDCCH carrying the DCI may be sent to the terminal through one or more antenna panels. In this way, the downlink scheduling problem when downlink data is sent through the plurality of antenna panels is solved.

In an alternative embodiment provided based on the embodiment of FIG. 6, a plurality of receiving beams that correspond to the plurality of TCI states and are used by the terminal for receiving the downlink data.

In another alternative embodiment provided based on the embodiment of FIG. 6 or any of the above alternative embodiments, a number of CORESETs that are used for sending PDCCHs and are preconfigured by the base station for the terminal is k, and k is an integer greater than 1.

PDCCHs sent by the k CORESETs are configured to be sent by using a same antenna panel. Alternatively, PDCCHs sent by at least two of the k CORESETs are configured to be sent by using different antenna panels.

Figure 7:
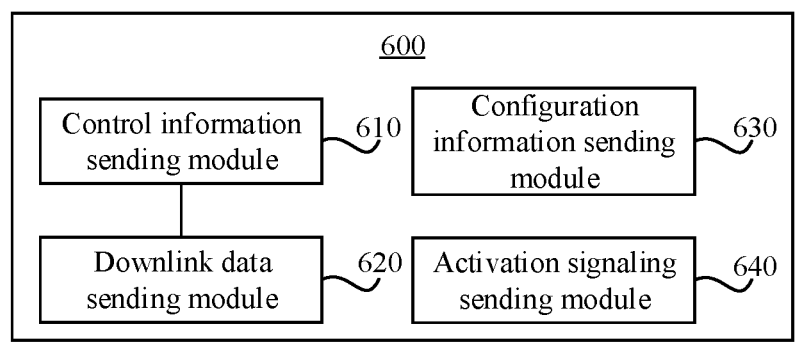
FIG. 7 is a block diagram of an apparatus for sending downlink data according to another exemplary embodiment.

Alternatively, as shown in FIG. 7, the apparatus 600 further includes a configuration information sending module 630.

The configuration information sending module 630 is configured to send CORESET configuration information to the terminal. The CORESET configuration information comprises identification information of antenna panels for sending PDCCH by using CORESET.

Alternatively, as shown in FIG. 7, the apparatus 600 further includes an activation signaling sending module 640.

The activation signaling sending module 640 is configured to send a MAC signaling to the terminal. The MAC signaling is used for activating a target TCI state and the target TCI state is used for indicating a receiving beam used by the terminal for receiving the first PDCCH.

It should be noted that when implementing its functions, the apparatus provided in the above embodiments is merely described by way of an example of the above partitioned functional modules. In practical application, the above function may be allocated to be performed by different functional modules. That is, the content structure of the device is partitioned into different functional modules to perform all or part of the functions described above.

With respect to the apparatus in the above embodiments, the specific manner in which the various modules perform operations has been described in detail in the embodiments relating to the method, and will not be described in detail herein.

An apparatus for receiving downlink data is also provided by an exemplary embodiment of the present disclosure. The apparatus is able to implement the method for receiving downlink data provided in the present disclosure. The apparatus may be a terminal described above, or may be set in a terminal. The apparatus includes a processor, and a memory for storing instructions executable for the processor. The processor is configured to perform the following operations.

A first DCI that is carried on a first PDCCH and sent by a base station through n antenna panels is received. The first DCI is used for scheduling m antenna panels of the base station to send downlink data to the terminal respectively, m is an integer greater than 1, and n is a positive integer.

At least one target receiving beam used for receiving the downlink data is determined according to the first DCI.

The downlink data is received by using the at least one target receiving beam.

Alternatively, the processor is configured to determine, according to a plurality of TCI states carried in the first DCI, a plurality of receiving beams corresponding to the plurality of TCI states as the at least one target receiving beam.

Alternatively, the processor is further configured to: when the terminal is not able to determine the target receiving beams according to the first DCI, receive the downlink data by using at least one default receiving beam.

Alternatively, a number of the at least one default receiving beam is one or more.

Alternatively, the at least one default receiving beam is at least one receiving beam used by the terminal to receive a second PDCCH. The second PDCCH is a PDCCH, in a latest scheduling unit that receives a PDCCH which is from a same antenna panel as the first PDCCH from, sent by a CORESET with a minimum number in at least one CORESET sent by the same antenna panel.

Alternatively, the at least one default receiving beam is at least one receiving beam used by the terminal to receive the first PDCCH.

Alternatively, the at least one default receiving beam is at least one receiving beam indicated in DCI carried on a latest PDCCH that is sent by using a same CORESET as the first PDCCH being sent by.

Alternatively, a number of CORESETs that are used for sending PDCCHs and are preconfigured by the base station for the terminal is k, and PDCCHs sent by at least two of the k CORESETs are configured to be sent by using different antenna panels, k being an integer greater than 1.

The processor is further configured to receive CORESET configuration information sent by the base station. The CORESET configuration information comprises identification information of antenna panels for sending PDCCH by using CORESET.

An apparatus for sending downlink data is provided by an exemplary embodiment of the present disclosure. The apparatus is able to implement the method for sending downlink data provided in the present disclosure. The apparatus may be a base station described above, or may be set in a base station. The apparatus includes a processor, and a memory for storing instructions executable for the processor. The processor is configured to perform the following operations.

A first DCI carried on a first PDCCH is sent to a terminal through n antenna panels. The first DCI is used for scheduling m antenna panels of the base station to send downlink data to the terminal respectively, m is an integer greater than 1, and n is a positive integer.

The downlink data is sent to the terminal through the m antenna panels respectively:

Alternatively, a plurality of TCI states are carried in the first DCI, and the plurality of TCI states are used for indicating a plurality of receiving beams that correspond to the plurality of TCI states and are used by the terminal for receiving the downlink data.

Alternatively, a number of CORESETs that are used for sending PDCCHs and are preconfigured by the base station for the terminal is k, and k is an integer greater than 1.

PDCCHs sent by the k CORESETs are configured to be sent by using a same antenna panel.

Alternatively, PDCCHs sent by at least two of the k CORESETs are configured to be sent by using different antenna panels.

Alternatively, the processor is further configured to send CORESET configuration information to the terminal. The CORESET configuration information comprises identification information of antenna panels for sending PDCCH by using CORESET.

Alternatively, the processor is further configured to send a MAC signaling to the terminal. The MAC signaling is used for activating a target TCI state, and the target TCI state is used for indicating a receiving beam used by the terminal for receiving the first PDCCH.

The above embodiments of the present disclosure have been described in terms of interaction between a base station and a terminal. It should be understood that the base station and the terminal include corresponding hardware structures and/or software modules for performing various functions in order to implement the above functions. The embodiments of the present disclosure can be implemented in hardware or a combination of hardware and computer software, with the elements and algorithm steps of the examples described in connection with the embodiments disclosed in the present disclosure. Whether a function is performed in hardware or computer software-driven hardware depends on the particular application and design constraints of the solution. Those skilled in the art may use different methods to implement the described functions for each particular application, but such implementation should not be considered to be beyond the scope of the technical solutions of the embodiments of the present disclosure.

Figure 8:
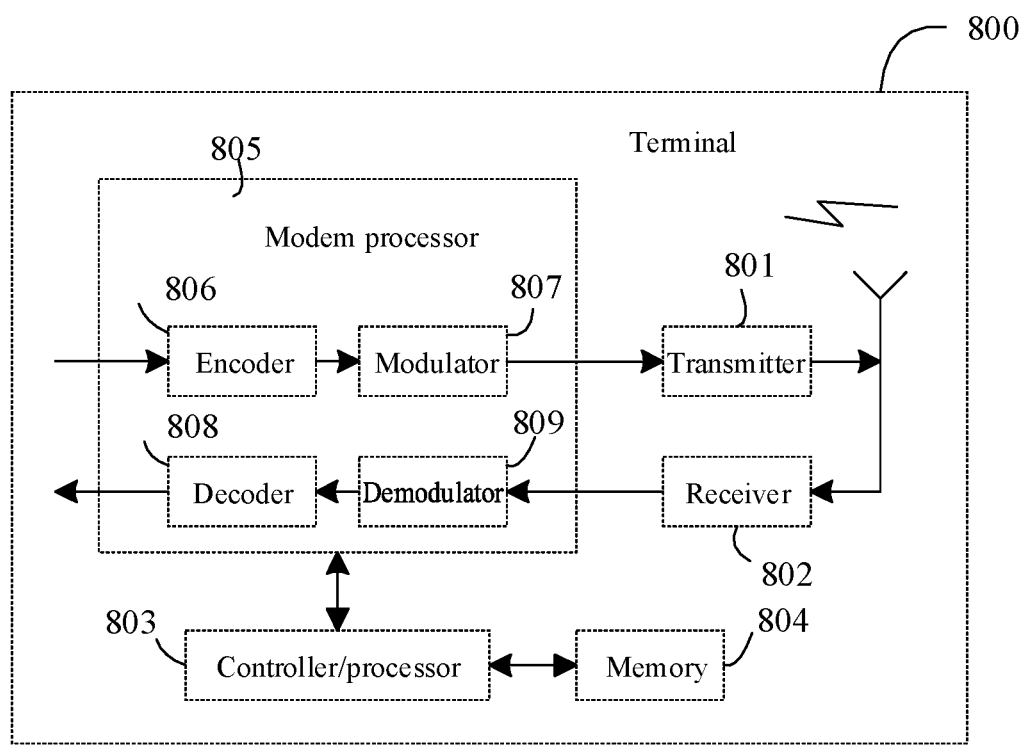
FIG. 8 is a schematic structural diagram of a terminal according to an exemplary embodiment.

FIG. 8 is a schematic structural diagram of a terminal according to an exemplary embodiment.

The terminal 800 includes a transmitter 801, a receiver 802, and a processor 803. The processor 803 may also be a controller, which is represented as "controller/processor 803" in FIG. 8. Alternatively, the terminal 800 may further include a modem processor 805. The modem processor 805 may include an encoder 806, a modulator 807, a decoder 808, and a demodulator 809.

In one example, the transmitter 801 regulates (e.g., analog converts, filters, amplifies, up-converts, etc.) the output samples and generates an uplink signal. The uplink signal is sent via an antenna to the base station described in the above embodiments. On the downlink, the antenna receives the downlink signal sent by the base station in the above embodiments. The receiver 802 regulates (e.g., filters, amplifies, down-converts, digitizes, etc.) signals received from the antenna and provides input samples. In the modem processor 805, the encoder 806 receives service data and signaling messages to be sent on the uplink and processes the service data and signaling messages (e.g., formatting, encoding, and interleaving). The modulator 807 further processes (e.g., symbol maps and modulates) the encoded service data and encoded signaling messages and provides output samples. Demodulator 809 processes (e.g., demodulates) the input samples and provides symbol estimations.

The decoder 808 processes (e.g., de-interleaves and decodes) the symbol estimations and provides decoded data and decoded signaling messages sent to the terminal 800. The encoder 806, modulator 807, demodulator 809, and decoder 808 may be implemented by a synthetic modem processor 805. These units perform processes according to the radio access technologies employed by the radio access network (e.g., access technologies of LTE and other evolved systems). It should be noted that when the terminal 800 does not include the modem processor 805, the above functions of the modem processor 805 may be performed by the processor 803.

The processor 803 controls and manages the operation of the terminal 800 to perform the processing performed by the terminal 800 in the above embodiments of the present disclosure. For example, the processor 803 is further configured to perform various steps on the terminal side in the above method embodiments, and/or other steps of the technical solutions described in the embodiments of the present disclosure.

Further, the terminal 800 may further include a memory 804. The memory 804 is used for storing program code and data used for the terminal 800.

It should be understood that FIG. 8 shows only a simplified design of the terminal 800. In practical applications, terminal 800 may include any number of transmitters, receivers, processors, modem processors, memories, and the like, while all terminals that may implement embodiments of the present disclosure are within the scope of the embodiments of the present disclosure.

Figure 9:
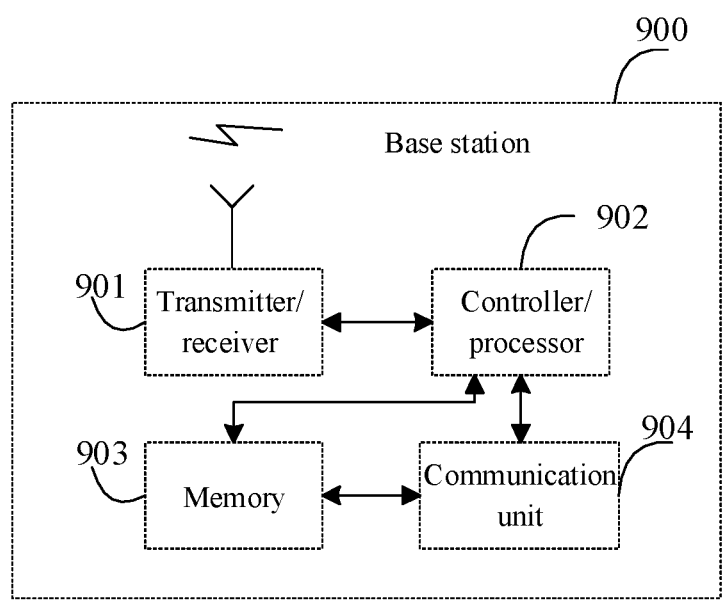
FIG. 9 is a schematic structural diagram of a base station according to an exemplary embodiment.

FIG. 9) is a schematic structural diagram of a base station according to an exemplary embodiment.

The base station 900 includes a transmitter/receiver 901 and a processor 902. The processor 902 may also be a controller, which is represented as "controller/processor 902" in FIG. 9. The transmitter/receiver 901 is configured to support transceiving information between a base station and the terminal in the above embodiments, and to support communication between the base station and other network entities. The processor 902 performs various functions for communicating with the terminal. On the uplink, an uplink signal from the terminal is received via an antenna, demodulated by a receiver 901 (e.g., a high frequency signal is demodulated into a baseband signal), and further processed by a processor 902 to recover service data and signaling messages sent by the terminal. On the downlink, service data and signaling messages are processed by the processor 902 and modulated by the transmitter 901 (e.g., the baseband signal is modulated into a high frequency signal) to generate a downlink signal and sent to the terminal via an antenna. It should be noted that the demodulation or modulation function may also be performed by the processor 902. For example, the processor 902 is further configured to perform each step of the base station side in the above method embodiments, and/or other steps of the technical solutions described in the embodiments of the present disclosure.

Further, the base station 900 may further include a memory 903 for storing program code and data of the base station 900. In addition, the base station 900 may also include a communication unit 904. The communication unit 904 is configured to support the base station 900 to communicate with other network entities, such as network devices in a core network, and the like. For example, in the 5G NR system, the communication unit 904 may be a NG-U interface for supporting communication between the base station 900 and an User Plane Function (UPF) entity. Alternatively, the communication unit 904 may be an NG-C interface for supporting communication between the base station 900 and an Access and Mobility Management Function (AMF) entity.

It should be understood that FIG. 9 merely shows a simplified design of the base station 900. In practical applications, base station 800 may include any number of transmitters, receivers, processors, controllers, memories, communication units, and the like, while all base stations that may implement embodiments of the present disclosure are within the scope of the embodiments of the present disclosure.

A non-transitory computer readable storage medium in which computer programs are stored is provided by embodiments of the present disclosure. When the computer programs are executed by a processor of a terminal, the above method for receiving downlink data at a terminal side is implemented.

A non-transitory computer readable storage medium in which computer programs are stored is provided by embodiments of the present disclosure. When the computer programs are executed by a processor of a base station, the above method for receiving downlink data at a base station side is implemented.

It should be understood that the "plurality" mentioned herein refers to two or more. "And/or" describes the association relationship of the associated object, indicating that there may be three relationships, for example, A and/or B, which may mean the following three cases: A exists alone, A and B exist at the same time, and B exists alone. The character "/" generally indicates that the associated objects are in an "or" relationship.

Other embodiments of the present disclosure will readily occur to those skilled in the art upon consideration of the specification and practice of the disclosure disclosed herein. The disclosure is intended to cover any variations, uses, or adaptive of the present disclosure. These variations, uses, or adaptive changes follow the general principles of the present disclosure and include common general knowledge or conventional technical means in the technical field, which are not disclosed in the present disclosure. The specification and the embodiments are considered as being exemplary only, with a true scope and spirit of the present disclosure being indicated by the following claims.

It should be understood that the present disclosure is not limited to the exact construction that has been described above and illustrated in the accompanying drawings, and that various modifications and changes may be made without departing from the scope thereof. The scope of the present disclosure is limited only by the appended claims.

The invention claimed is:

1. A method for receiving downlink data, comprising:
receiving, by a terminal, first downlink control information (DCI) that is carried on a first physical downlink control channel (PDCCH) and sent by a base station through n antenna panels, wherein the first DCI schedules a plurality of antenna panels of the base station to respectively send downlink data to the terminal, and n is a positive integer,
wherein a number of Control Resource Sets (CORESETs) that are used for sending PDCCHs and are preconfigured by the base station for the terminal is k, and PDCCHs sent by at least two of the k CORESETs are configured to be sent using different antenna panels, k being an integer greater than 1;
determining, by the terminal according to the first DCI, at least one target receiving beam for receiving the downlink data; and receiving, by the terminal, the downlink data using the at least one target receiving beam, wherein the method further comprises:

in response to the terminal being not able to determine the at least one target receiving beam according to the first DCI, receiving, by the terminal, the downlink data using at least one default receiving beam, wherein the at least one default receiving beam is at least one receiving beam used by the terminal to receive a second PDCCH, wherein the second PDCCH is a PDCCH, in a latest scheduling unit that receives a PDCCH which is from a same antenna panel as the first PDCCH from, sent by a CORESET with a minimum number in at least one CORESET sent by the same antenna panel.

2. The method of claim 1, wherein determining, by the terminal according to the first DCI, the at least one target receiving beam for receiving the downlink data comprises:

determining, by the terminal according to a plurality of transmission configuration indication (TCI) states carried in the first DCI, a plurality receiving beams corresponding to the plurality of TCI states as the at least one target receiving beam.

3. The method of claim 1, wherein a number of the at least one default receiving beam is one or more.

4. The method of claim 1, wherein the method further comprises:

receiving, by the terminal, CORESET configuration information sent by the base station, wherein the CORESET configuration information comprises identification information of antenna panels for sending PDCCH using CORESET.

5. A method for sending downlink data, comprising:

sending, by a base station, first downlink control information (DCI) carried on a first physical downlink control channel (PDCCH) to a terminal through n antenna panels, wherein the first DCI schedules a plurality of antenna panels of the base station to respectively send downlink data to the terminal, and n is a positive integer, wherein a number of Control Resource Sets (CORESETs) that are used for sending PDCCHs and are preconfigured by the base station for the terminal is k, and PDCCHs sent by at least two of the k CORESETs are configured to be sent using different antenna panels, k being an integer greater than 1; and respectively sending, by the base station, the downlink data to the terminal through the plurality of antenna panels, wherein the first DCI is configured to be used by the terminal to determine at least one target receiving beam used for receiving the downlink data so as to receive the downlink data by using the least one target receiving beam, wherein in response to that the at least one target receiving beam is not able to be determined according to the first DCI, at least one default receiving beam is used to receive the downlink data, wherein the at least one default receiving beam is at least one receiving beam used by the terminal to receive a second PDCCH, wherein the second PDCCH is a PDCCH, in a latest scheduling unit that receives a PDCCH which is from a same antenna panel as the first PDCCH from, sent by a CORESET with a minimum number in at least one CORESET sent by the same antenna panel.

6. The method of claim 5, wherein a plurality of transmission configuration indication (TCI) states are carried in the first DCI, and the plurality of TCI states indicate a plurality of receiving beams that correspond to the plurality of TCI states and are used by the terminal for receiving the downlink data.

7. The method of claim 5, further comprising:

sending, by the base station, CORESET configuration information to the terminal, wherein the CORESET configuration information comprises identification information of antenna panels for sending PDCCH using CORESET.

8. The method of claim 5, further comprising:

sending, by the base station, a medium access control (MAC) signaling to the terminal, wherein the MAC signaling activates a target TCI state, and the target TCI state indicates a receiving beam used by the terminal for receiving the first PDCCH.

9. A device for receiving downlink data, applied in a terminal, comprising:

a processor; and a memory for storing instructions executable for the processor;

wherein the processor is configured to:

receive first downlink control information (DCI) that is carried on a first physical downlink control channel (PDCCH) and sent by a base station through n antenna panels, wherein the first DCI schedules a plurality of antenna panels of the base station to respectively send downlink data to the terminal, and n is a positive integer, wherein a number of Control Resource Sets (CORESETs) that are used for sending PDCCHs and are preconfigured by the base station for the terminal is k, and PDCCHs sent by at least two of the k CORESETs are configured to be sent using different antenna panels, k being an integer greater than 1;

determine, according to the first DCI, at least one target receiving beam for receiving the downlink data; and receive the downlink data using the at least one target receiving beam, wherein the processor is further configured to:

in response to the terminal being not able to determine the at least one target receiving beam according to the first DCI, receive the downlink data using at least one default receiving beam, wherein the at least one default receiving beam is at least one receiving beam used by the terminal to receive a second PDCCH, wherein the second PDCCH is a PDCCH, in a latest scheduling unit that receives a PDCCH which is from a same antenna panel as the first PDCCH from, sent by a CORESET with a minimum number in at least one CORESET sent by the same antenna panel.

10. The device of claim 9, wherein the processor is further configured to:

determine, according to a plurality of transmission configuration indication (TCI) states carried in the first DCI, receiving beams corresponding to one of the plurality of TCI states as the at least one target receiving beam.

11. The device of claim 9, wherein a number of the at least one default receiving beam is one or more.

12. The device of claim 9, wherein the processor is further configured to:

receive CORESET configuration information sent by the base station, wherein the CORESET configuration information comprises identification information of antenna panels for sending PDCCH using CORESET.

* * * * *